United States Patent [19]

Daines

[11] Patent Number: 5,188,275

[45] Date of Patent: Feb. 23, 1993

[54] FRICTION BONDING CLAMP FOR A ROTOR BLADE

[75] Inventor: John W. Daines, Bristol, England

[73] Assignee: Rolls-Royce plc, London, United Kingdom

[21] Appl. No.: 913,757

[22] Filed: Jul. 17, 1992

Related U.S. Application Data

[63] Continuation of Ser. No. 703,872, May 22, 1991, abandoned.

[30] Foreign Application Priority Data

May 24, 1990 [GB] United Kingdom ............... 9011605

[51] Int. Cl.⁵ .................. B23K 20/12; B23P 15/04; B25B 5/14
[52] U.S. Cl. ............................. 228/2; 269/909; 29/889.1; 29/888.021
[58] Field of Search ............ 228/1.1, 2, 112, 110; 269/40, 909, 237; 29/889.1, 888.021

[56] References Cited

U.S. PATENT DOCUMENTS

| | | | |
|---|---|---|---|
| 3,222,884 | 12/1965 | Lyle | 279/87 |
| 3,460,734 | 8/1969 | Vill et al. | 228/2 |
| 3,512,792 | 5/1970 | Farley | 279/51 |
| 3,542,275 | 11/1970 | Loyd | 228/2 |
| 3,584,777 | 6/1971 | Loyd | 228/2 |
| 3,768,147 | 10/1973 | Berry | 228/112 |
| 3,840,168 | 10/1974 | Searle et al. | 228/112 |
| 4,285,108 | 8/1981 | Arrigoni | 29/889.1 |
| 4,377,428 | 3/1983 | Toth | 228/112 |
| 4,873,751 | 10/1989 | Walker | 29/889.1 |
| 4,883,216 | 11/1989 | Patsfall | 29/889.1 |
| 5,031,288 | 7/1991 | Sadler | 228/112 |
| 5,031,311 | 7/1991 | Comensoli | 29/889.1 |
| 5,035,411 | 7/1991 | Daines et al. | 228/2 |

FOREIGN PATENT DOCUMENTS

| | | |
|---|---|---|
| 471962 | 3/1951 | Canada ............................. 269/234 |
| 290134 | 11/1988 | European Pat. Off. . |
| 2245599 | 6/1973 | Fed. Rep. of Germany . |
| 1204129 | 9/1970 | United Kingdom . |
| 1278959 | 6/1972 | United Kingdom . |
| 1293531 | 10/1972 | United Kingdom . |
| 1293532 | 10/1972 | United Kingdom . |
| 1378182 | 12/1974 | United Kingdom . |
| 1440865 | 6/1976 | United Kingdom . |
| 2237758 | 5/1991 | United Kingdom . |

Primary Examiner—Richard K. Seidel
Assistant Examiner—Jeanne M. Elpel
Attorney, Agent, or Firm—Oliff & Berridge

[57] ABSTRACT

Apparatus and a method for attaching individual blades to a disc rotor of a BLISK is described. Blade blanks or preforms are gripped between adjustable jaws of a rigid frame member of a linear friction bonding machine, and are attached in a non-rotational friction bonding operation. Blade preforms may be finished to final airfoil shape in a further operation after attachment. The technique is suitable for repair work or original manufacture.

5 Claims, 2 Drawing Sheets

FRICTION BONDING CLAMP FOR A ROTOR BLADE

This is a continuation of application Ser. No. 07/703,872 filed May 22, 1991, now abandoned.

BACKGROUND OF THE INVENTION

1. Field of the Invention

The invention relates to apparatus for performing friction bonding operations. In particular, it concerns apparatus for performing a non-rotational frictional bonding operation.

2. Description of the Prior Art

An embodiment of the invention as described in detail hereinafter is particularly concerned with the manufacture or repair of a bladed disc, sometimes known as a BLISK. A bladed disc comprises a disc or wheel on the periphery of which there is attached or carried a multiplicity of blades. In a conventional rotor assembly the blades are attached to a disc or wheel by interlocking root fixtures. In bladed discs the blades are either formed integrally with the disc or are non-dismountably attached thereto. The present invention finds application for the manufacture or repair of assemblies in which the inter-blade spacing is very close and the blades may also be small. Such an example may be in the repair of a high pressure compressor bladed disc rotor.

Small blades are also relatively fragile and may be easily damaged during a friction bonding operation which involves very large forces to produce the required frictional heating effects. Therefore, it is preferred to work with a blade blank or preform and to finish the blade to its final shape after bonding

SUMMARY OF THE INVENTION

According to the invention in its broadest aspect a blade or blade preform is attached to the rim of a bladed disc in a non-rotational friction bonding operation.

According to one aspect of the present invention apparatus for performing a non-rotational friction bonding operation comprises moveable clamping means having jaws with opposing faces adapted to positively engage opposite sides of a blade member during the bonding operation to impart thereto the necessary bonding forces. Preferably the clamping means comprises a generally U-shaped frame member having a pair of limbs adapted to engage the member to be bonded.

BRIEF DESCRIPTION OF THE DRAWINGS

The invention and how it may be carried into practice will now be described in greater detail with reference by way of example only to the accompanying drawings, in which.

DESCRIPTION OF THE PREFERRED EMBODIMENTS

Figure 1:
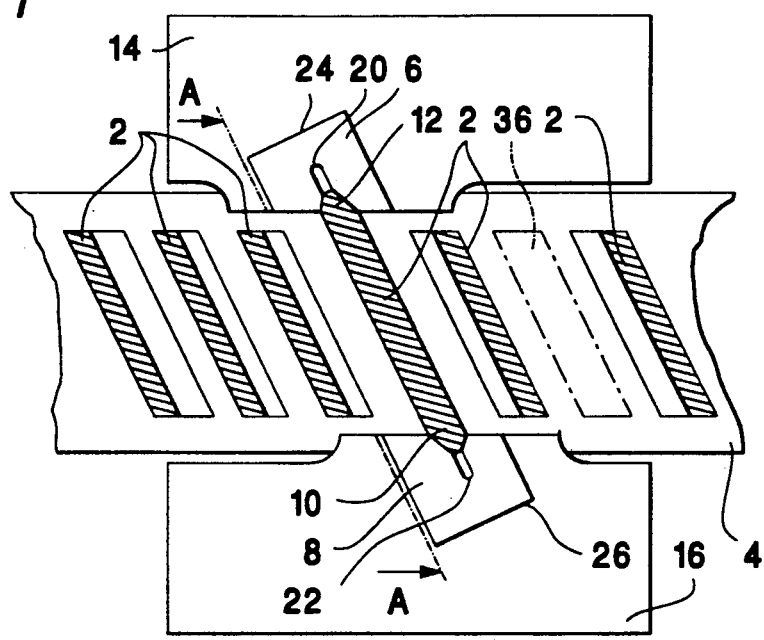
FIG. 1 shows a schematic diagram of a blade replacement operation viewed in a radial direction.

Referring now to the drawings, in which like parts have been given like references, the example illustrated involves the repair of a bladed disc, or BLISK, using a linear friction bonding operation.

A blade preform or blank 2 is bonded to the periphery of disc 4, a fragment of which is shown in the drawing, at a predetermined location. FIG. 1 shows such a blade preform 2 clamped between jaw pieces 6,8 of a clamping means at the start of a bonding operation.

The preform 2 consists of solid block of metal of appropriate shape and size. At the leading and trailing edge regions 10,12 a considerable amount of sacrificial metal is left by which the jaw pieces 6,8 grip the preform 2. The edges are formed with angled faces for engagement by the jaw pieces. In FIG. 1 the radially outer ends of preforms 2 are shown hatched for easier reference. After finishing of the blade airfoil shape these end faces form the blade tip faces.

The clamping means comprises the jaw pieces 6,8 set in the inner faces of the limbs 14,16 of a U-shaped frame 18. The jaw pieces 6,8 are moveable and located in channels 24,26 in the inner faces of limbs 14,16 respectively. The jaw pieces 6,8 have angled grip faces, V-shaped in plan to grip the complementary angled faces on the leading and trailing edges of the preform 2. At the apex of the angled faces relatively deep grooves 20,22 are cut into the jaw pieces to provide the angled faces with a degree of resilience in gripping the preform.

Figure 2:
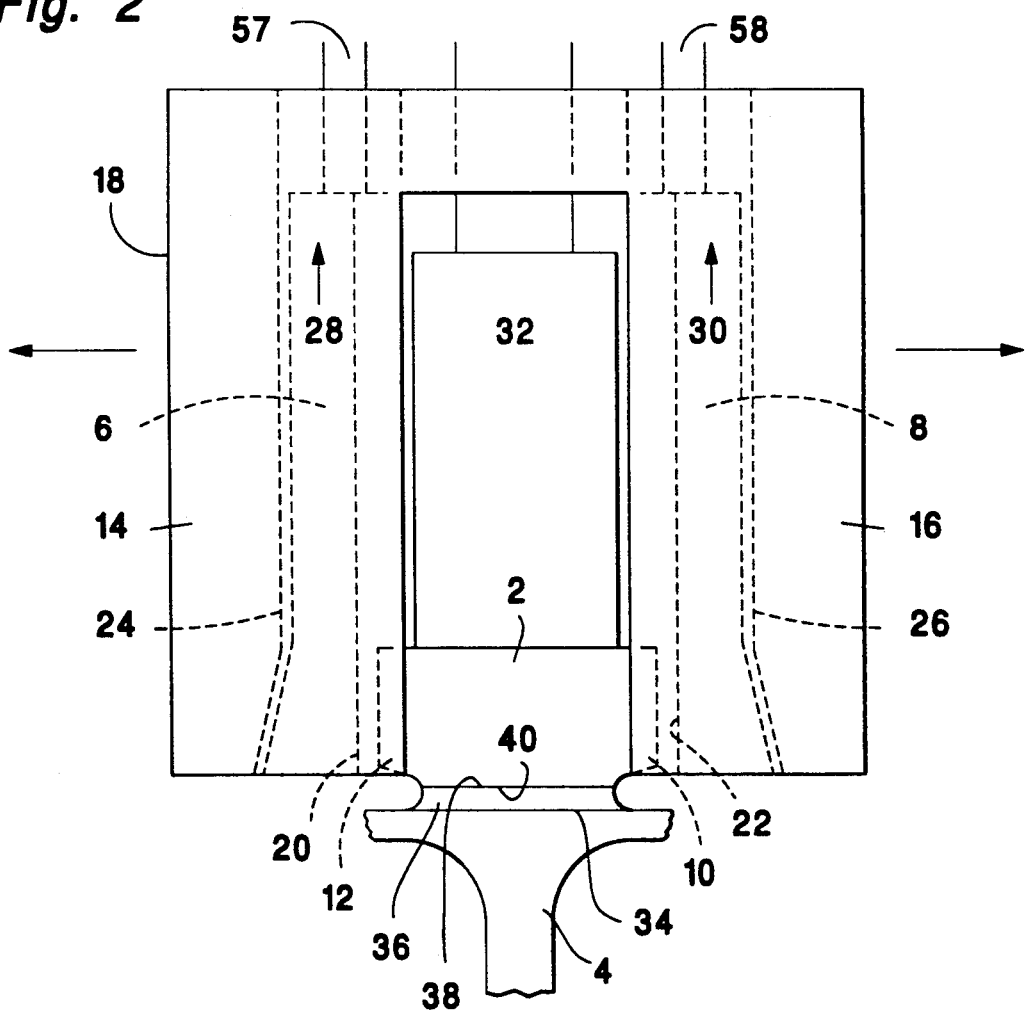
FIG. 2 shows a view in the direction of arrows AA in FIG. 1, and FIGS. 2A-2C show the gripping process wherein the jaw pieces are drawn up the channel, thus clamping the blade member.
Figure 2A:
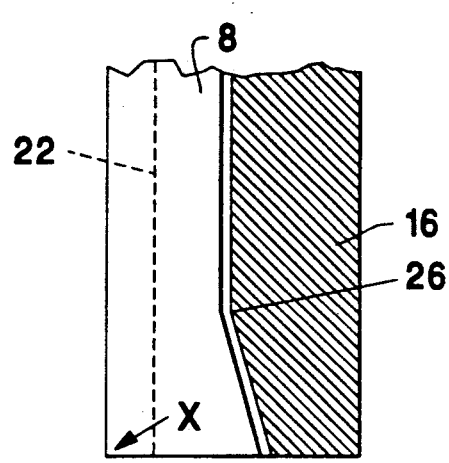
Figure 2B:
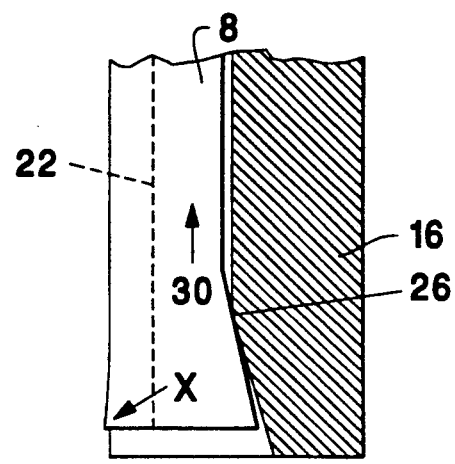
Figure 2C:
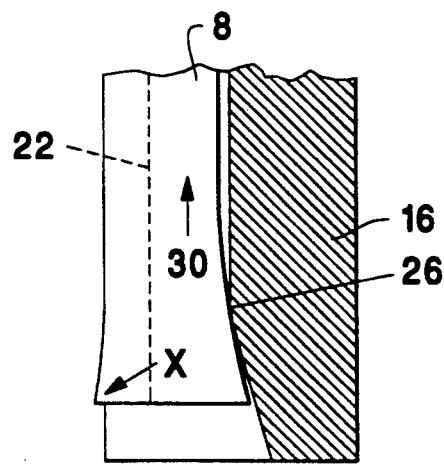

The jaw pieces 6,8 are located, as mentioned above, in channels 24,26 formed in the inner faces of the frame limbs 14,16. The jaw pieces are slideable longitudinally in the channels. Towards the distal end of each limb the base of the channel and the abutting face of the respective jaw pieces are angled obliquely with respect to the longitudinal direction of movement. These angled surfaces converge towards the upper or closed part of the clamping frame so that by drawing the jaw pieces 6,8 upwardly in FIG. 2, in the direction of arrows 28,30, their grip on the blade preform 2 is tightened (see FIGS. 2A-2C).

The jaw pieces 6,8 may extend longitudinally in the directions of arrows 28,30 as shown in the drawings or may be attached to tensile members. The remote ends of the jaw pieces extensions or the tensile members, are connected to hydraulic tension means (57,58) which is energised to draw the jaw pieces upwardly to grip the preform. Clearly the clamping means may be released from the preform after a bonding operation by relaxing the tensioning force in the jaw pieces.

The moveable clamping frame 18 also carries a ram 32 which bears against the tip face of blade preform 2 and applies the required upset force to effect bonding at the end of the frictional heating phase of the operation.

It is preferred to replace a blade belonging to a BLISK rotor using this method as follows. First, the old or damaged blade is removed just above the peripheral surface 34 of the disc rim leaving a stub portion 36. The upper surface 38 of this stub is made flat and the foot of the replacement blade preform is bonded to it. The preform 2 is at least longer than the stub 36 due to the presence of the sacrificial gripping regions 10 and 2. It may be slightly wider also. The lower margin of the preform is therefore preferably chamfered so that lower surface 40 matches upper surface 38 of stub 36.

The surface 40 may be made shaped for better control of the frictional heating phase.

During the frictional heating phase of a bonding operation the clamping means containing the preform 2 is moved back and forth (arrows). Several directions of movement are available in the plane of the joint. The amplitude of this movement is small, generally only a few millimetres is required and is at a low frequency. For maximum rigidity the jaws of the clamping means are wider than the inter-blade spacing. Because of the resulting overlap the distance between the jaws must provide sufficient clearance for the chosen motion. The extra distance is easily provided for in the edge regions 10,12 on the preform 2. Thus, during the whole of a bonding operation clearance is maintained between the clamping means and adjacent blade tips.

For maximum lateral rigidity the jaw pieces are preferably flush with the face of the clamping means. Where the blades are closely spaced the clearance distance must be maintained to avoid blade damage. It follows, therefore, that the edge regions 10,12 of a blade preform which are intended to be engaged by the clamping means must be removed after bonding and before another blade may be bonded at an adjacent location. Alternatively, a number of blade preforms may be bonded sequentially at locations sufficiently far apart. In the illustrated case the minimum spacing is alternate locations. A whole BLISK could be manufactured, if desired, in this way by bonding blades at, say, alternate locations in a first operation, subsequently removing surplus metal and then bonding the remaining blades in a further operation.

Finally, after the bonding operation, or operations if more than one blade preform is attached, the preform or preforms are finished to final blade airfoil shape by a further manufacturing operation. Surplus metal including that upset during bonding is removed at this stage, for example, by electro-chemical machining.

I claim:

1. In an apparatus for performing a non-rotational friction bonding operation to bond a blade member defining a longitudinal direction to a disc rotor assembly, a clamping means for clamping the blade member laterally during the bonding operation, the clamping means comprising:

a generally U-shaped frame member defined in part by a pair of longitudinally extending limb members, each limb member having a channel extending longitudinally from its distal end and facing the corresponding channel of the other limb member, each channel being shaped to have a tapering cross-section as it proceeds longitudinally from its respective distal end;

a pair of jaw pieces, each jaw piece being adapted to slide longitudinally within the channel of a respective limb member, having gripping means adapted to positively grip a side of the blade member when the blade member is located between the jaw pieces; and a means for moving the jaw pieces longitudinally along their respective channels, wherein each jaw piece is so structured that when the jaw piece is moved longitudinally in its respective channel in a direction away from the distal end of the limb member, the jaw piece cooperates with the tapering channel so as to cause the gripping means to grip the blade member more positively.

2. The clamping means as claimed in claim 1, wherein the tapering cross-section extends from the distal end of the limb member.

3. The clamping means as claimed in claim 1, wherein the gripping means is provided by a pair of angled grip faces adapted to grip complementary angled faces of the blade member, a groove being provided in the jaw piece at the apex of each angled grip face to provide the angled grip faces with a degree of resilience in gripping the blade member when the jaw piece is moved in, and cooperates with, the taper of its respective channel.

4. The clamping means as claimed in claim 1, wherein the U-shaped frame member is provided with ram means adapted to bear longitudinally against the blade member and apply a required force to effect bonding between the blade member and a disc rotor assembly.

5. The clamping means as claimed in claim 1, wherein each jaw piece is flush with the inner face of the respective limb member, so as to provide maximum lateral rigidity.

* * * * *